Jan. 1, 1929.
H. A. DELANO
BUMPER
Filed Jan. 10, 1927
1,697,496
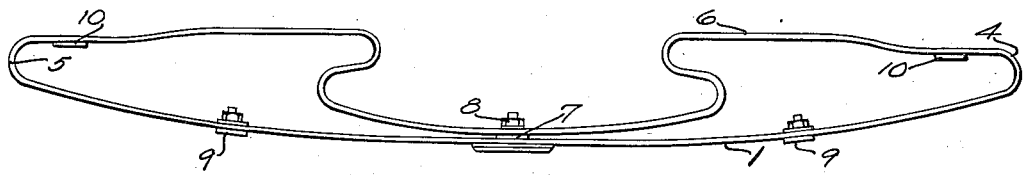
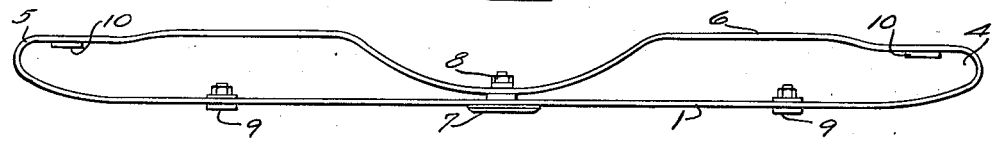
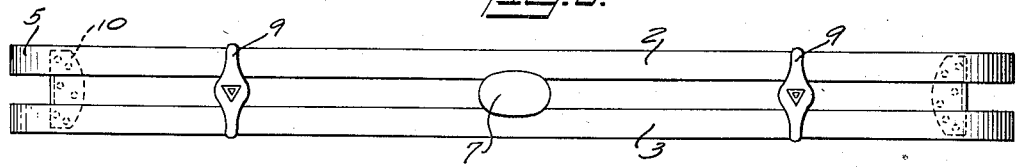
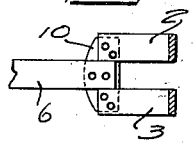
INVENTOR
Howard A. Delano.
BY
ATTORNEY Patented Jan. 1, 1929.

1,697,496

UNITED STATES PATENT OFFICE.

HOWARD A. DELANO, OF YORK, PENNSYLVANIA, ASSIGNOR TO AMERICAN CHAIN COMPANY, INC., A CORPORATION OF NEW YORK.

BUMPER.

Application filed January 10, 1927. Serial No. 160,070.

This invention relates to automobile bumpers, and more particularly to a type of bumper having metal bars of a degree of resiliency sufficient to absorb the shock of impact, these bars being bent or otherwise shaped to provide a protecting means to the vehicle.

An object is the use of a plate or bar as a connecting means between the front or impact member and the rear or connecting member, this plate being welded to the ends of the standard parts of the bumper.

A further object of this invention is to provide a bumper which is pleasing to the eye, and inexpensive to manufacture.

A clear conception of the construction and further objects of the invention may be had from the following specification, in conjunction with the accompanying drawings, in which—

Fig. 1 is a plan view of the preferred form of the invention.

Fig. 2 shows a modified form of the invention.

Fig. 3 is a front view of Figs. 1 and 2; and

Fig. 4 is a detail of the connector plate.

The now preferred form of the invention consists of an impact member 1, comprising a pair of bars 2 and 3, of thin strip steel, having their end portions bent rearwardly and inwardly in a U-shape forming end loops 4 and 5 terminating a short distance inwardly from the extremities of the impact member. The loops 4 and 5 in both bars are of substantially the same curvature and therefore may be vertically aligned. The rear or connecting bar 6 consists of a single strip of spring steel having an S-shaped construction on both sides of its center portion, as shown in Fig. 1, and the extremities of said strip are bent outwardly to coincide with the extremities of end loops 4 and 5 of bars 2 and 3. The center portion of rear bar 6 is fastened to the impact member 1 by a clamping plate 7, which also maintains the bars 2 and 3 in a vertical alignment. This clamping device holds the rear bar in close relation with the impact member by means of a bolt 8, passing through the center of clamp 7 between bars 2 and 3, and through a hole in the center of bar 6. Midway between the clamp 7 and the end loops 4 and 5 are clamps 9, which are also designed to hold bars 2 and 3 in vertical alignment.

As a connecting means between the impact member 1 and the rear bar 6 a plate 10 is used. It is shaped as shown in Fig. 4, and the ends of bars 2, 3 and 6 are welded together in vertical alignment, thereby forming a strong joint, which is also pleasing to the eye.

A modified form of the bumper is shown in Fig. 2. For clearness, the same designating numerals have been used as in Figs. 1 and 3, and the construction is materially the same, with the exception of the rear bar 6 which is drawn forward in an arc as shown and held by clamp 7. Impact member 1 is the same comprising bars 2 and 3, spaced and vertically aligned by clamping members 9. The connecting plate 10 is of the same construction and is welded to the impact member and rear bar in the same manner.

Claims—

1. In an automobile bumper, an impact member comprising a pair of vertically aligned transversely extending bars having loop ends thereon, a rear bar being forwardly bent to engage with said impact member at its mid-point, the ends of said rear bar being bent forward into alignment with said loop ends, and a pair of plates adapted to be welded to the ends of said impact members and said rear bar in vertical alignment.

2. In an automobile bumper, an impact member comprising a pair of vertically aligned transversely extending bars having loop ends thereon, a rear bar being forwardly bent to engage with said impact member at its mid-point, the ends of said rear bar being bent forward into alignment with said loop ends, clamping means for holding said rear bar in close relation with said impact member, and a pair of plates to which the ends of said impact members and said rear bar are welded in vertical alignment.

3. In an automobile bumper, an impact member, comprising a pair of vertically aligned transversely extending bars, having loop ends thereon, a rear bar having a pair of S-shaped bends therein, the mid-point of said rear bar being held in close engagement with the mid-point of said impact member by a clamping device, and a pair of plates to which the ends of said impact members and said rear bars are welded in vertical alignment.

In testimony whereof, I have signed this specification.

HOWARD A. DELANO.